United States Patent [19]
Lubeck

[11] 3,970,401
[45] July 20, 1976

[54] TUBULAR STRUCTURES

[76] Inventor: Donald Lubeck, 4 Ferry Lane, Barrington, R.I. 02806

[22] Filed: May 28, 1974

[21] Appl. No.: 474,073

[52] U.S. Cl. .................................. 403/265; 52/251; 52/309; 52/311; 52/724; 52/743; 52/753 T; 264/261; 264/263; 297/DIG. 1; 297/DIG. 2
[51] Int. Cl.² .................. F16B 12/04; F16L 13/11
[58] Field of Search .......... 403/265, 267, 268, 269; 52/311, 753 C, 753 D, 753 T, 758 B, 722, 723, 724, 725, 309, 250, 251, 436, 743; 264/45, 249, 250, 254, 261, 263, 271; 297/DIG. 1, DIG. 2

[56] References Cited
UNITED STATES PATENTS

| | | | |
|---|---|---|---|
| 1,053,646 | 2/1913 | Roberts | 52/725 |
| 2,189,201 | 2/1940 | Flader | 52/758 B |
| 3,039,727 | 6/1962 | Engel, Jr. et al. | 248/224 |
| 3,386,119 | 6/1968 | Shulman | 264/45 |
| 3,608,007 | 9/1971 | Hendrikson | 264/45 |
| 3,639,001 | 2/1972 | Anderson | 52/311 |
| 3,664,693 | 5/1972 | Irons | 403/269 |
| 3,680,898 | 8/1972 | Herrmann | 52/753 D |
| 3,798,867 | 3/1974 | Starling | 52/743 |
| 3,798,869 | 3/1974 | Nipp | 52/743 |

Primary Examiner—Werner H. Schroeder
Assistant Examiner—Conrad L. Berman
Attorney, Agent, or Firm—Salter & Michaelson

[57] ABSTRACT

The structures of the present invention start with a basic hollow tube of any desired outer shape and made of paper, plastic or metal. When paper is used, it is vacuum impregnated with a plastic resin and oven baked to give it rigidity. The tube may also be covered with an ornamental veneer, if desired. The tubes are provided with suitable openings to receive matching counterparts fitting against the openings. Strong, rigid core members of wood, plastic or metal are positioned in the tubular members with the abutting portions of the core members interconnected. The structure is placed in a clamp to hold the parts together in proper position. Polyurethane is then poured into one end, the end is capped, and the structure is rotated to evenly distribute the polyurethane. The urethane sets at room temperature and expands as it sets to internally mold the members into a solid structure. The finished structure can be drilled, machined, or bolted to add features in the conventional manner.

4 Claims, 8 Drawing Figures

U.S. Patent   July 20, 1976   Sheet 1 of 2   3,970,401
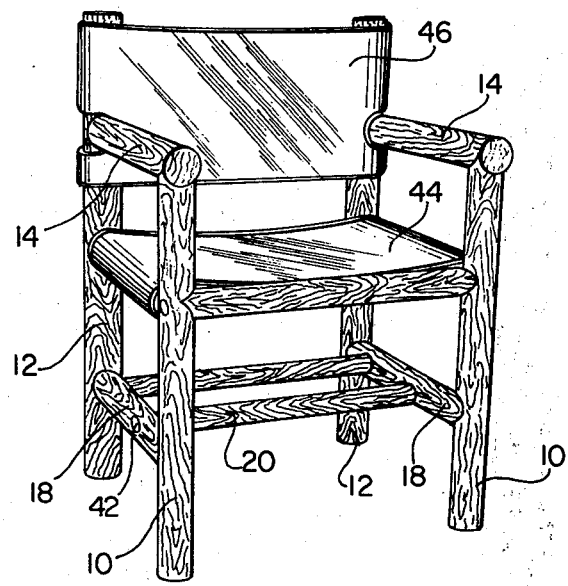
FIG. 1
FIG. 2
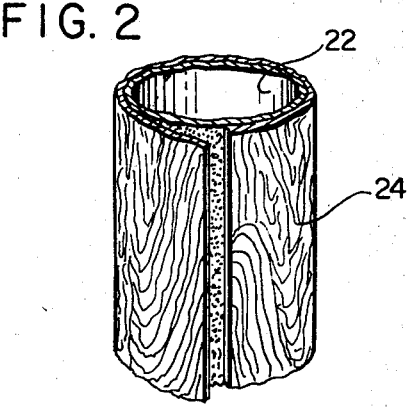
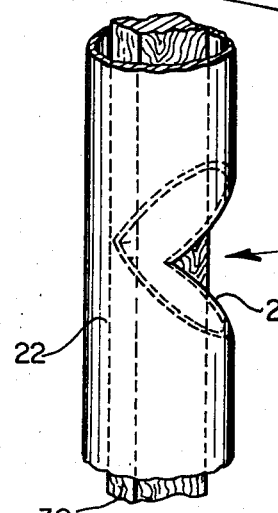
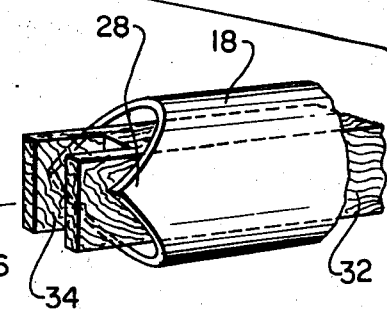
FIG. 3
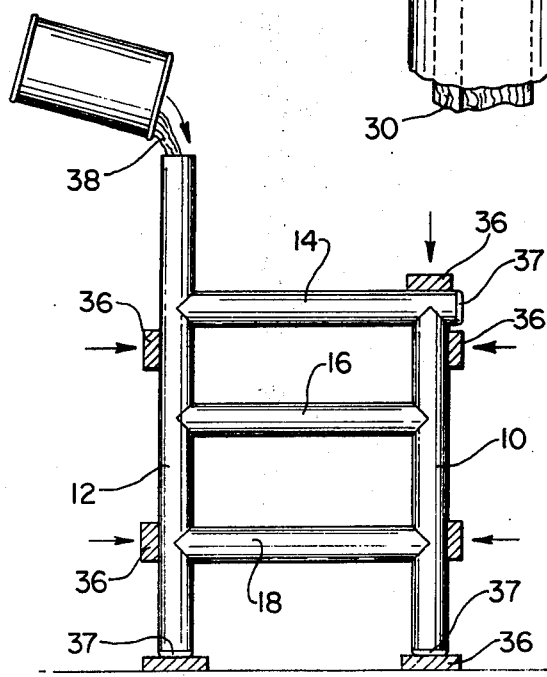
FIG. 4

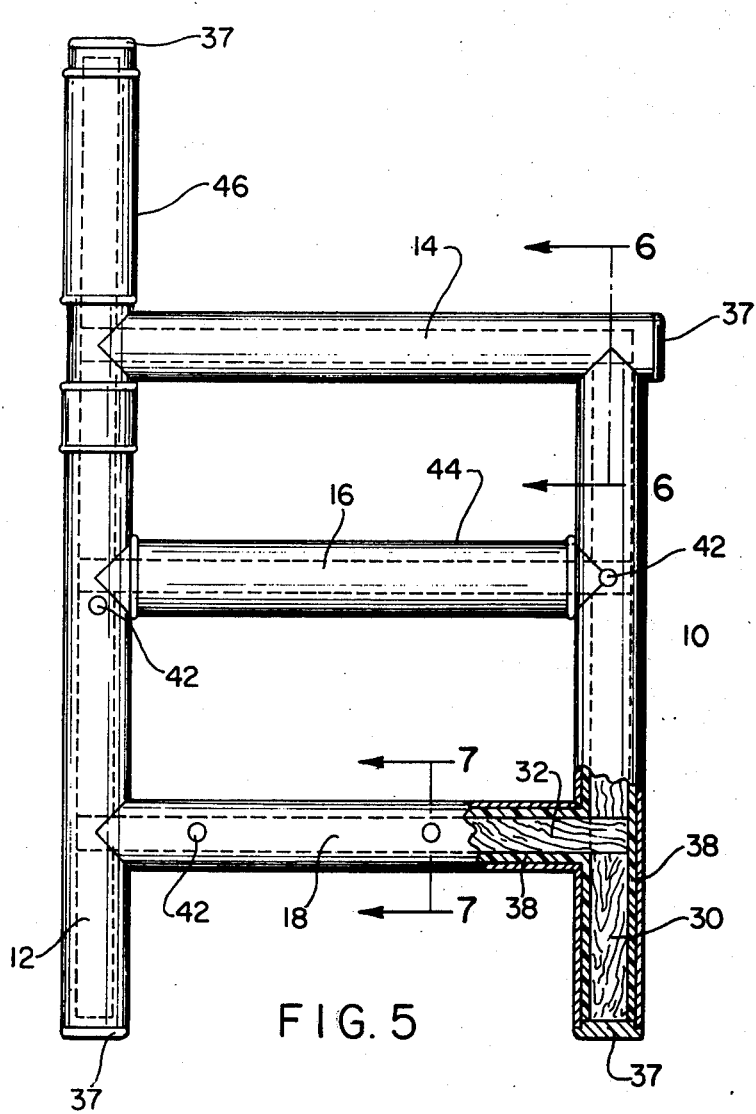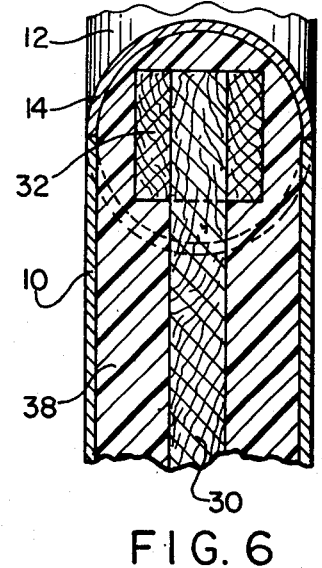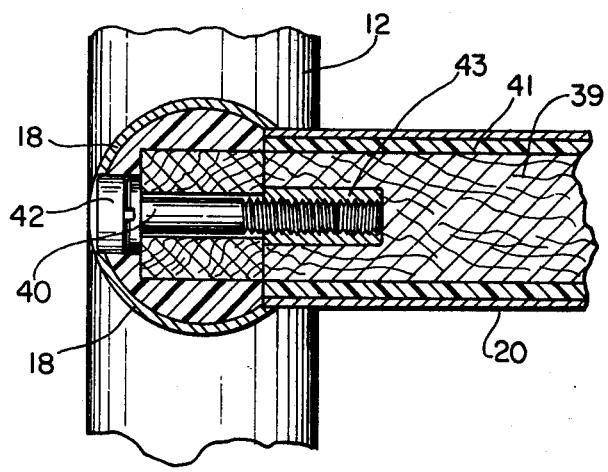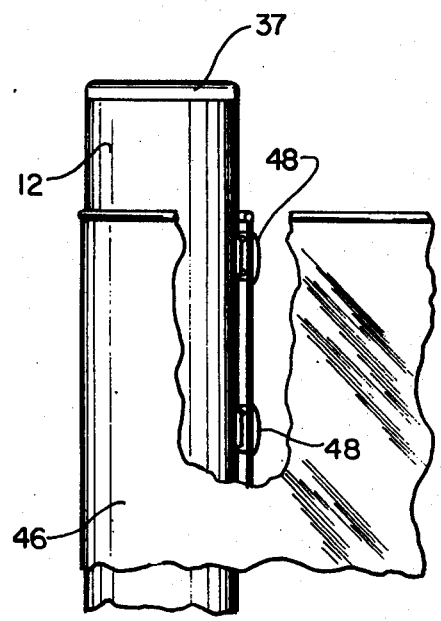
FIG. 5
FIG. 6
FIG. 7
FIG. 8

TUBULAR STRUCTURES

BACKGROUND OF THE INVENTION

It has been known that plastic articles can be strengthened by molding the plastic around a solid core. Many articles are so constructed. Also, tubular articles have been filled with foam plastic to provide strength with lightness. Therefore, there are many combinations of solid cores or hollow items used in combination with plastic material to provide strength and rigidity with a minimum of weight. However, most of these articles must be assembled, joined, or otherwise constructed in a conventional manner, using nuts and bolts, nails, glue, or other conventional joining means.

SUMMARY OF THE INVENTION

The present invention provides a method of forming tubular structures in which the finished article is largely joined in a novel manner forming a more integral finished unit. The method starts with a hollow tube of any desired shape and made of paper, plastic or metal. When paper is used, the tube is first vacuum impregnated with a resin to provide dimensional stability. The hollow tube can be covered with a veneer to provide color, design, or both. The hollow members are now machined and cut out where necessary to abut the joining member at right angles. At the same time, core members of wood, plastic or metal are placed in the hollow members, the core members being joined in abutting position by dovetailing or any other conventional method. The assembled structure is placed in a clamp, and polyurethane is poured into one end. The space to be filled is computed, and the polyurethane is introduced with a somewhat less volume, since the urethane expands while setting at room temperature. The structure is rotated to ensure a complete and even distribution of the urethane. After setting, the finished finished structure then be added to by drilling, bolting, gluing, or any other means. However, the structure will present a complete integral assembly of great strength and supporting power.

DESCRIPTION OF THE DRAWINGS

In the drawings which illustrate the best mode presently contemplated for carrying out the present invention:

FIG. 1 is a perspective view of a chair embodying framework made by the method of the present invention;

FIG. 2 is a perspective view of the base hollow tube and veneer that form a part of my invention;

FIG. 3 is an exploded perspective fragmentary view showing the assembly of the members prior to applying the urethane;

FIG. 4 is a side elevation of the chair of FIG. 1 showing the step of pouring the urethane;

FIG. 5 is a side elevation, partly in section, of one of the completed structural elements;

FIG. 6 is an enlarged section taken on line 6—6 of FIG. 5;

FIG. 7 is an enlarged section taken on line 7—7 of FIG. 5; and

FIG. 8 is a fragmentary view showing one method of attachment of additional elements to the structure.

DESCRIPTION OF THE INVENTION

The invention relates to a method of assembling and joining relatively light-weight tubular structures having durability, strength and supporting power. Any suitable article may be formed by the present method. However, for purposes of illustration, the structure is shown as applied to a piece of furniture, such as a chair. Accordingly, the chair shown in FIG. 1 is provided with front vertical legs 10, rear vertical legs 12, longer than the front legs 10, arm rests 14, side seat supporting bars 16 (FIGS. 4 and 5), lower side rungs 18, and thinner cross struts 20 bracing the rungs 18.

The construction of the chair structure will become more evident in detail by the method of manufacture. The first step is the selection of a proper hollow tube made of paper, plastic or metal and formed in a round, square, oval, or any other suitable cross section. In the illustrated form, the tube 22, FIG. 2, is round. Where a paper tube is used, it is preferably vacuum impregnated with a resin and oven baked at approximately 350° F. to make it dimensionally stable.

Step two of the method provides the tubular structure with a surface ornamentation. The tube 22 is coated with an adhesive and wrapped with a thin veneer 24, approximately 1/85 inch thick. This can form a simulated wood grain, a color, or any other desired design.

Step three is illustrated in FIG. 3. The hollow members are machined and cut to receive matching counterparts. The tube 22, which may be any of the vertical members 10 or 12, is cut to provide a V-notch 26. The horizontal rung 18 is shaped at the end to form a wedge shape 28 adapted to nest into the notch 26, FIG. 4. It will be understood that the important thing is that the hollow members make intimate abutting engagement with each other at their nesting points and that there be free communication between the members at said points. Thus, if the hollow members were of square cross section, rather than round, as illustrated, one of the hollow members would have a square cutout or notch, adapted to receive the end of the mating hollow member, rather than the V-notch and wedge shape illustrated. It will therefore be obvious that reference herein to "nesting" of connected hollow members is meant to cover any intimate abutting engagement between the end of one member and the surface of the other member.

Step four, also illustrated in FIG. 3, provides for the core members. The vertical core members 30 and horizontal core members 32 may be made of wood, plastic or metal. They are cut in advance, preferably with a rectangular section, and positioned in the tubes 22. At each point where the tubes are abutted at right angles, as by the wedge shapes 28 entering the notches 26, the core members are interconnected to each other. In the illustrated form, the end of the horizontal core member 32 is provided with a groove 34 into which the vertical member 30 fits to form a tongue-and-groove connection. Dovetails, or any other conventional joining technique, can be used.

Step five of the method is illustrated in FIG. 4. The tubes having been cut, machined, cored, and assembled, to form a particular structure such as the chair side illustrated, the structure is placed in a clamp 36 which applies a holding pressure as shown by the arrows in FIG. 4 to hold the assembly tightly together. I now provide a polyurethane having a 12 to 20 lb. density, 12 lbs. being preferred. As illustrated, the urethane 38 is in liquid form and is poured into one end of the vertical leg 12. While it is setting, the clamp assembly is rotated to distribute the urethane evenly throughout the structure. Since the urethane expands while setting, the space to be filled is computed, and the urethane is introduced in a volume somewhat less than the total to allow for the expansion. As will be seen, the free ends of the members 10, 12 and 14 are capped, as at 37.

The setting of the urethane permanently welds the parts of the structure into a single unitary piece having great strength and supporting power. As can be seen in FIGS. 5 and 6, the cores 30 and 32 are welded at the joints by the urethane 38, which has flowed throughout the entire network of interconnected parts, such as, for example, the network shown in FIG. 4. The cores not only serve to strengthen the network, but they also reduce the amount of urethane required, this being of significance since urethane is relatively expensive. On the other hand, it is obviously possible to eliminate the cores, whereby the tubular members 10, 12, 14, 16 and 18 would be entirely filled with and integrated by the urethane.

The integrated structure or network can be added to or implemented by any conventional means, FIGS. 7 and 8 being illustrative. For example, the chair shown in FIG. 1 is provided with the cross struts 20 which may be solid, or formed as shown in FIG. 7 with a core 39 surrounded by urethane as at 41. The rung 18 is counterbored to receive the end of strut 20 and is drilled to receive a bolt 40 anchored in a metallic insert 43 in the end of the strut with the opening covered by a plug 42 for a finished appearance. Since a chair is illustrated, the seat 44 and back 46 can be mounted by providing the members 12 with studs 48, wrapping the back 46 around the post 12 and attaching to the studs 48. The seat 44 is similarly mounted.

The above method thus provides an extremely strong unitary structure suitable for furniture, ladders, etc., in which the various elements are molded into a virtual one-piece integral structure. Other advantages of the present invention will be readily apparent to a person skilled in the art.

What is claimed is:

1. A free standing portable structure that is capable of supporting loads thereon, comprising a plurality of hollow tubular members that are interfitted to define a unitary construction, said members being formed of an oven baked resin impregnated paper, each of said members having a reinforcing core located therein that extends substantially the length thereof, the core of each member occupying less than the total volume therein to define an interior space therein, each member having portions of the core therein exposed at predetermined locations, the core of each member at an exposed location engaging an exposed core of an adjacent member for interengaging the members, a plurality of communicating channels being defined by the interior spaces of the members that are interengaged by the cores therein, and a polyurethane filler material extending throughout the interior of said members and occupying the spaces formed therein to positively interlock the members together in the unitary construction.

2. A structure as in claim 1, wherein said reinforcing cores comprise elongated wooden cores of rectangular cross section.

3. A structure as in claim 1, wherein said cores are joined by a tongue and groove arrangement, the tongue being formed on a first core and being received in a groove formed in a mating core.

4. A structure as in claim 1, wherein said hollow tubular members include exposed surfaces of ornamental veneer.

* * * * *